Figure 1:
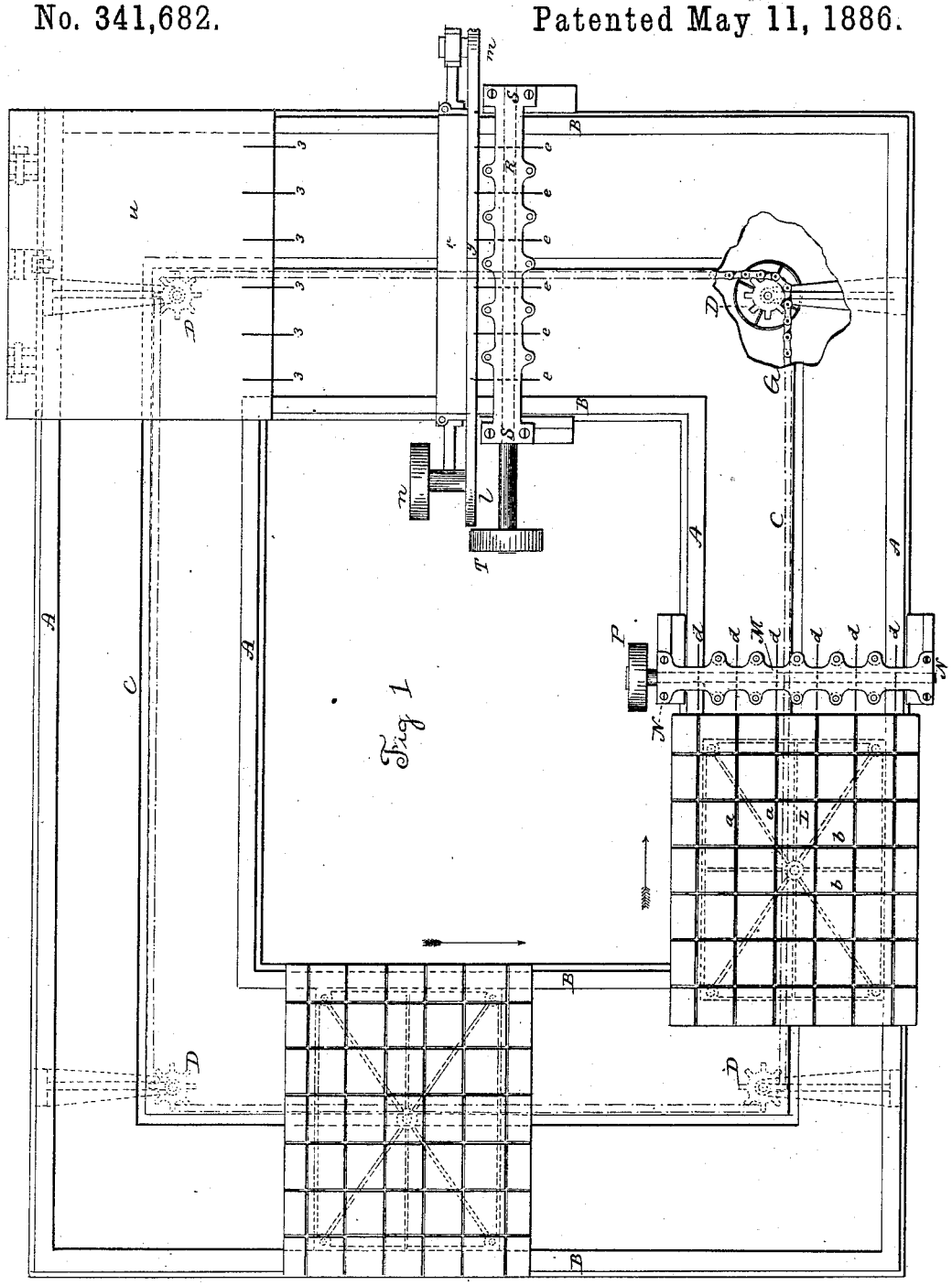

(No Model.) 3 Sheets—Sheet 1.

J. J. PEARD.
MACHINE FOR CUTTING FISH.

No. 341,682. Patented May 11, 1886.

Witnesses.
J. H. Shumway
F. C. Earle

James J. Peard.
Inventor.
By Atty.

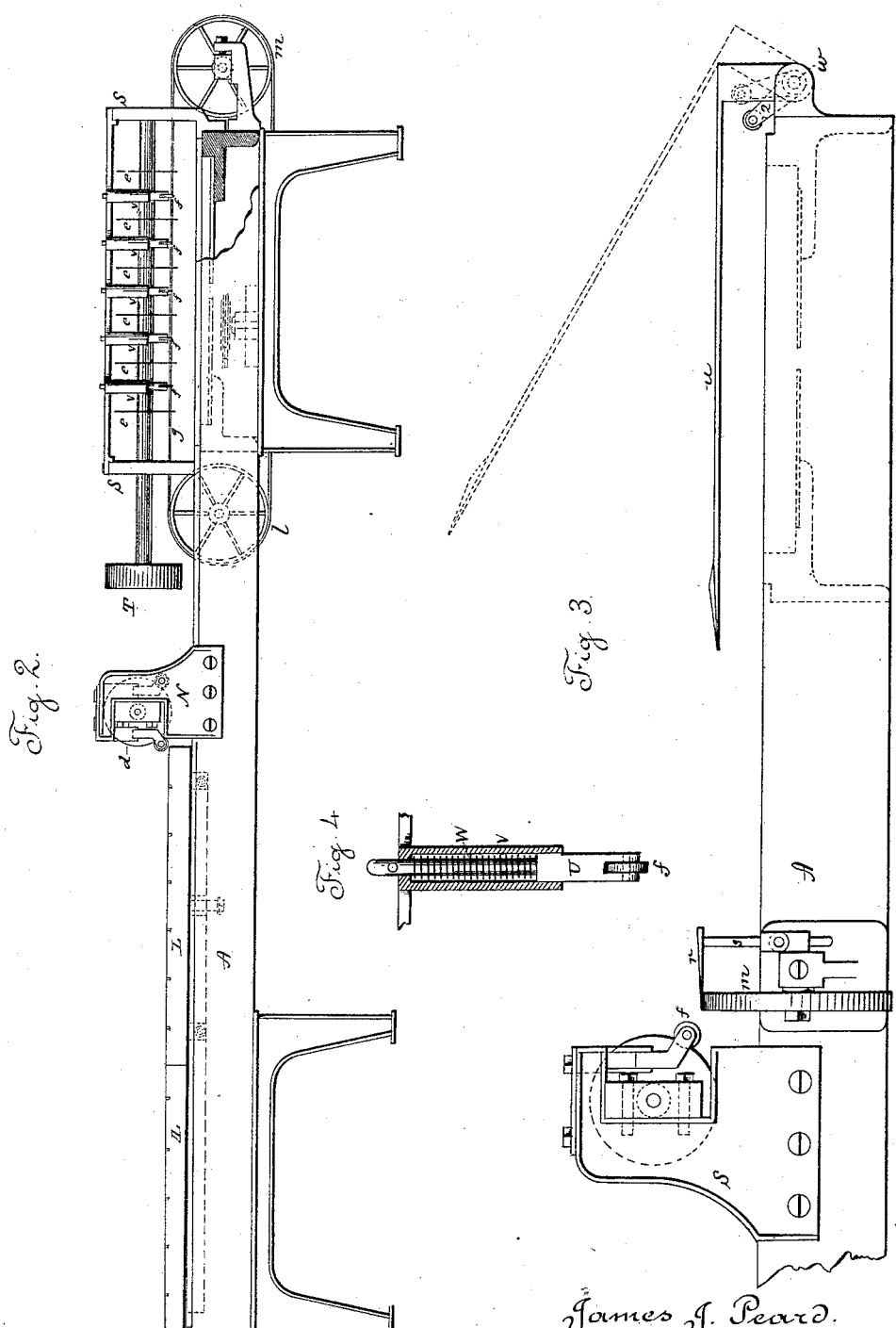

(No Model.)　　　　　　　　　　　　　　　　3 Sheets—Sheet 3.
J. J. PEARD.
MACHINE FOR CUTTING FISH.
No. 341,682.　　　　　　　　　　Patented May 11, 1886.
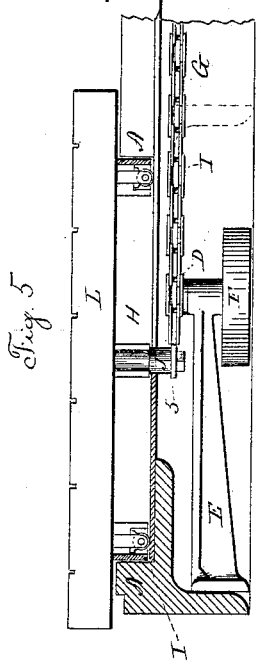
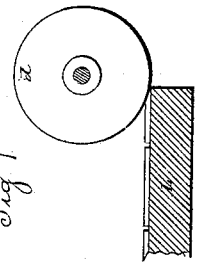
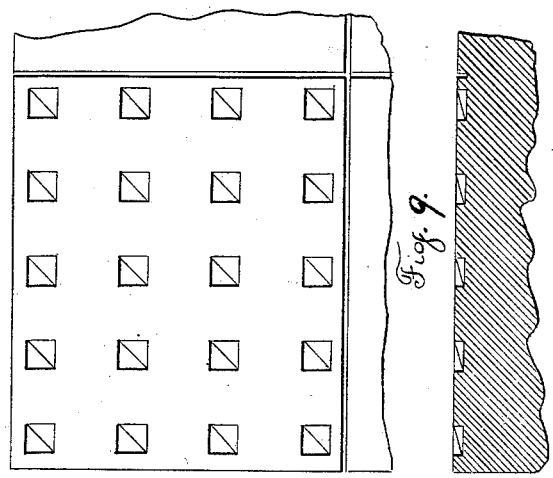
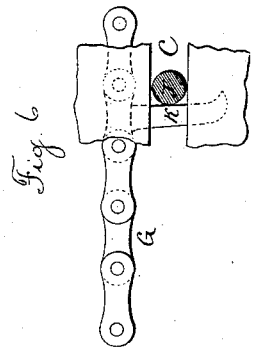
Witnesses.　　　　　　　　　　　　James J. Peard.
　　　　　　　　　　　　　　　　　　　　Inventor
　　　　　　　　　　　　　　　　By Atty.

UNITED STATES PATENT OFFICE.

JAMES J. PEARD, OF HARTFORD, CONNECTICUT, ASSIGNOR TO THE COLTS PATENT FIRE ARMS MANUFACTURING COMPANY, OF SAME PLACE.

MACHINE FOR CUTTING FISH.

SPECIFICATION forming part of Letters Patent No. 341,682, dated May 11, 1886.

Application filed January 9, 1886. Serial No. 188,064. (No model.)

*To all whom it may concern:*

Be it known that I, JAMES J. PEARD, of Hartford, in the county of Hartford and State of Connecticut, have invented a new Improvement in Machines for Cutting Fish; and I do hereby declare the following, when taken in connection with accompanying drawings and the letters of reference marked thereon, to be a full, clear, and exact description of the same, and which said drawings constitute part of this specification, and represent, in—

Figure 1, a top or plan view, portions broken away to illustrate the mechanism beneath the tracks; Fig. 2, a side view, portions also broken away to illustrate the construction of the parts; Fig. 3, a partial side view from the right of Figs. 1 and 2, enlarged; Fig. 4, a vertical section through one of the pressers; Fig. 5, a vertical section cutting near one of the angles; Fig. 6, a top view of a portion of one of the tracks or guideways, showing the slot, the chain, and its connection with the stud which extends down from the table; Fig. 7, a section through the cutting-board, showing the relation of one of the revolving cutters to the grooves in the cutting-board; Fig. 8, a top view; and Fig. 9, a transverse section of a portion of the cutting-board, showing a method of roughening the surface.

This invention relates to a machine for cutting salted or dried fish into blocks of a cubical shape. In putting up this class of fish for market several thicknesses are placed or pressed together, after being cut into blocks of equal dimensions as to length, width, and thickness.

The object of this invention is the construction of an automatic machine which shall be simple in its operations, and adapted to receive the fish in mass and cut the same into blocks of the required dimensions; and the invention consists, generally, in a track of rectangular shape, the said track forming guideways for carriages carrying cutting boards or tables, combined with a traveling endless chain in a path to follow parallel with the respective guideways, and adapted to engage the carriages or cutting-boards and force the said boards to travel along the track at one side, arriving at the angle to follow the track on the next side, but without turning the board, and so continuing around the four sides of the track, the direction of movement of the carriage changing at each angle, but without turning the carriage, and with two revolving shafts, each carrying series of disk-like cutters, one of said shafts with its cutters arranged above the track or guideway at one side and at right angles thereto, the other shaft and its cutters arranged in like manner across a second side, which is at right angles to the side on which the first shaft is arranged, and whereby the cutting-plane of the said knives in one series will be at right angles to the plane of the other series, the said planes being parallel with the tracks over which they are arranged, and so that a mass of fish placed upon the carriage at one point passing beneath the first series of revolving knives the fish will be cut in strips parallel with the path of movement of the carriage, and arriving at the next cutters the cuts will be made transversely of the strips and so as to divide them into symmetrical blocks, and also having combined therewith an endless splitting-knife, adapted to split or divide the blocks horizontally, and also having combined therewith a discharging device adapted to remove the blocks so cut and make way for a second mass of fish, and also in details of construction, as more fully hereinafter described, and particularly recited in the claims.

The body of the machine is in the shape of a rectangle composed of two sides and two ends, which may be of equal length. On the sides are two parallel tracks or guides, A A. The other two sides form parallel tracks B B, the two tracks or guides at each end being at right angles to the guides of the two sides, the outer guides meeting at the outer angles, the inner guides meeting at the inner angles, as seen in Fig. 1. The guides A A are preferably nearer together than the guides B B, and preferably the space between the guides is covered, but so as to leave a continuous slot, C, around between the guides. The said slot should be in a central line between the respective guides. Below the slot C, at each angle, a sprocket-wheel, D, is arranged upon a vertical shaft supported in bearings—say as in a bracket, E, (see Fig. 5,)—to the shaft of one of which a pulley, F, is applied, or other device by which power may be communicated to impart revolution to the said sprocket-wheel. Around the sprocket-wheels an endless chain, G, is arranged to engage the said wheels, and so that by the rotation of the one wheel a continuous movement will be imparted to said chain, the said chain following the slot on the four sides—that is, is parallel with the slot on each side.

Between the guides A A a carriage, H, is arranged. The carriage is of rectangular form, in width corresponding to the distance between the guides A A, and in length to the distance between the guides B B. The carriage is preferably supported on caster-wheels I, as seen in Fig. 5.—one at each angle—the said casters hung upon vertical axes, so as to readily turn to adapt themselves to the movement of the carriage, whether it be between the tracks on the sides or between the tracks at the ends. From the carriage a stud, J, extends down through the slot between the tracks, as seen in Fig. 5. The chain is provided with several laterally-projecting arms K, (see Fig. 6,) which extend across the slot, and so as to engage the stud J, as seen in Fig. 5, and so that as the chain travels the arm K, engaging the stud J, will impart a movement to the carriage corresponding to that of the chain, the said stud following the slot on one side until it comes to the angle, and there, as the arm turns around the sprocket-wheel, it will turn the direction of its action upon the carriage and carry it between the guides along the end until the next angle is met, and there will turn in like manner; but the carriage itself does not turn. On the sides it moves in the direction the length of the carriage, and along the ends it moves in the direction across the carriage. Each carriage is provided with a suitable cutting-board, L, on the upper surface of which longitudinal narrow grooves $a$ are formed, the grooves being parallel with each other and with the path of movement in a longitudinal direction of the carriage, and distant from each other according to the width of the blocks to be cut. Transversely across the cutting-board similar grooves, $b$, are made at right angles to the grooves $a$, distant from each other according to the length of the blocks to be cut.

Across and above the guideways A A a shaft, M, is arranged at right angles to the guideways, supported in a bearing, N, at each side, the bearings distant from each other, so as to permit the cutting-boards to pass between. Power is applied to impart revolution to this shaft through a pulley, P, or otherwise. The shaft carries a series of cutting disks or knives, $d$, corresponding in number and position to the longitudinal grooves on the cutting-board, and in such relation to the plane of the cutting-board that as the cutting-board passes beneath the shaft the edge of the cutters will run through their respective grooves or extend slightly below the surface of the cutting-board.

Above the guides B B is a like shaft, R, at right angles to the said guides B B—that is, at right angles to the shaft M—and supported in bearings S, power being applied to impart rotation thereto through a pulley, T, or otherwise. The shaft R carries a series of cutting disks or knives, $e$, corresponding in number and position to the transverse grooves $b$ on the cutting-board, and in such relation to the cutting-board that, as the cutting-board passes beneath, the edge of the cutters $e$ will run through the grooves $b$ or extend slightly below the surface of the cutting-board. At each side of the two shafts a series of pressing devices are applied, beneath which the tables will pass. As here represented, these pressing devices consist of a vertical slide, U, (see Fig. 4,) arranged in a suitable guide, V, provided with a spring, W, the tendency of which is to force the guide U downward. Each of these guides U carries a roller, $f$, and they are arranged one series each side the vertical central line of the shaft, and so that one pair of rollers stand midway between the respective cutters, as seen in Fig. 2. The spring adapts the slides to yield vertically, as the unevenness of the material passing beneath them may require; but the tendency of the spring is to press the rollers down upon the material. The position of the rollers is outside of the active cutting-edge of the cutters, as seen in Fig. 2, the axis of the rollers being parallel with the cutter-shaft.

At one point in the machine, and preferably directly in rear of the one series of cutters, a horizontal cutter is arranged, which consists of an endless metal band-cutter, $g$, which passes around pulleys $l$, at one side, and a like pulley, $m$, at the opposite side. (See Fig. 2.) The pulleys are arranged upon shafts at right angles to the cutter-shaft, and power is applied to impart rotation to one of the pulleys through a pulley, $n$, or otherwise, and so that a constant traveling movement in a horizontal path will be imparted to the said endless or band cutter $g$. This cutter works in a plane parallel with the plane of the cutting-boards, and so far above the cutting-board as the thickness of the blocks requires.

In operation the fish is placed upon the cutting-board. Before it reaches the first series of cutters—say as seen at the left in Fig. 1—the carriage, traveling in the direction indicated by the arrow, brings its load to the first angle, where the direction of movement is changed to drive the carriage in a longitudinal direction, as indicated at the side in Fig. 1, and, continuing its movement, as it approaches the cutters the first series of rollers $f$ bear upon the surface before the mass of fish reaches the cutters, and thus serves to hold the fish firmly upon the cutting-board. Advancing, the revolving cutters cut through the mass of moving fish and divide it into strips of equal width. As it passes beyond the cutters, the second series of rollers bear upon the respective strips and prevent their displacement. The carriage, with its load of strips, continues its movement until it arrives at the next angle, and there its direction of movement is changed to a transverse direction, and, arriving at the cutters, as before, the strips are held by the rollers, and the cutters divide the strips transversely into blocks. Then passing on, and while the last series of rollers is still bearing upon the blocks, the horizontal cutter *g* is reached, and that cutter works through the blocks, cutting them to the required thickness. Thence the carriage passes on, carrying its load of completed blocks ready for discharge or removal from the machine. As a support for the horizontal cutter *g*, I arrange a plate, *r*, directly in rear of the cutter and in substantially the same plane, its edge thin and so as to lie upon the upper surface of the cutter, and with a shoulder against which the back of the cutter will run as a support, and, as seen in Fig. 3, the plate readily passing through the cut made by the cutter. The plate *r* is supported at each end on suitable standards, *s*.

As a device to remove the blocks from the cutting-boards, I arrange, preferably at the angle next following the last cut, a stripper, *u*, hung outside the frame, as at *w*. (See Fig. 3.) This stripper extends toward the advancing carriage, the axis of the hinge upon which the stripper *u* is hung being at right angles to the path of the advancing carriage. This stripper is constructed, preferably, with a thin edge and in the plane of the upper surface of the cutting-board, and so that it may enter between the cutting-board and the fish thereon, and so that as the carriage advances and passes beneath the stripper *u* the blocks of fish will be forced onto the stripper *u*, free from the carriage, and then as the carriage completes its advance toward that angle it strikes an arm, 2, which extends up from the axis upon which the stripper *u* is hung, and so that as the carriage completes its movement in that direction it will turn the arm 2 and tilt the stripper *u*, as indicated in broken lines, Fig. 3, to a sufficient extent to cause the blocks of fish to slide therefrom into any suitable receptacle prepared therefor. I preferably provide the stripper *u* with slim projecting fingers 3, corresponding to the grooves in the cutting-board, which advances toward it, and so that they may enter the grooves beneath the fish and aid in the movement of the fish onto the stripper.

It is desirable to offer some resistance between the table and the fish, in order to prevent the movement of the mass by the action of the cutters, or in its passage from place to place. To this end I form cavities, preferably square, or so as to present two sides corresponding to the direction of movement in which the cutting-board travels, as seen in top view, Fig. 8, and in section, Fig. 9. The fish will be depressed into these cavities to a greater or less extent, but sufficiently to take such a hold upon the fish as to prevent its slipping on the cutting board, and thus offer a considerable resistance to the action of the cutters. At the same time the surface of the cutting-board is free from all obstructions, projections, or protuberances, and the fish is as readily laid upon the board with these depressions as if the surface were perfectly smooth.

While I have represented the guides or tracks of different lengths on opposite sides, it will be understood that the relative length of each side is immaterial to the invention, and while I have represented the blocks as to be made longer than their width it will be understood that they may be square, the relative length of the respective sides depending only upon the relative position of the two series of cutters.

The parts are made adjustable in the usual manner of adjusting parts of machinery too well known to those skilled in the art to require particular description herein.

I have illustrated but a single horizontal cutter, so as to make but a single horizontal division in the mass of fish; but it will be understood that the band-cutter may be duplicated for a second cut, or as many horizontal cutters employed as it is desired to divide the blocks horizontally.

I claim—

1. In a machine for cutting fish, two parallel guideways connected by two other parallel guideways at right angles thereto, the said four guideways forming a track of rectangular shape, combined with an endless chain arranged to travel in a plane parallel with the plane of said guideways and in a like rectangular path, each of its sides parallel with and within the respective guideways, a carriage arranged upon said guideways and adapted to move thereon through one side to the angle, and there to pass onto the next side, but without changing its relative position to the respective guideways, the said carriage connected to said endless chain, and whereby the movement of the chain will be imparted to the carriage, a revolving shaft over one of said guideways and at right angles thereto, the said shaft carrying a series of disk-like cutters revolving with the shaft in a plane parallel with the guideway over which they are arranged, and a second shaft arranged over one of the guideways which is at right angles to the first, and so that the shaft will be at substantially right angles to the said first shaft, the said second shaft carrying a similar series of disk-like cutters, and beneath which said two series of cutters the said carriage is adapted to pass, substantially as described, and whereby the fish placed on said carriage, as it passes beneath the first series of cutters, will be cut into strips, and, passing beneath the second series, the said strips will be cut into blocks.

2. The combination of two parallel guideways connected by two other parallel guideways at right angles thereto, the four guideways forming a continuous rectangular-shaped track, an endless chain arranged to travel in a plane parallel with the plane of said tracks and in a rectangular path corresponding to the rectangular shape of the track, one or more carriages arranged in said guideways and in connection with said chain, whereby the movement of the said chain will be imparted to the said carriage, the said carriage adapted to follow the track on one side to the angle, and then to pass onto the next side at right angles to the first, but without changing its relative position to the respective tracks, a cutting-board on said carriage having a series of grooves parallel with the track on one side, and a similar series of grooves at right angles to the first series of grooves, a shaft over one of said guideways and at right angles thereto, and beneath which the said carriage, with its cutting-board, may pass, a series of disk-like cutters on said shaft corresponding to one of the series of grooves in said cutting-board, a second shaft arranged over one of the guideways at right angles to the guideway over which the first shaft is arranged, the axis of said second shaft being at right angles to the axis of the first shaft, and a series of disk-like cutters on said second shaft corresponding to the other series of grooves in said cutting-board, the said cutters in the two series adapted, the one to work through its series of grooves, and then the second series of cutters to work through its series of grooves, substantially as described.

3. The combination of a rectangular track, a corresponding endless chain traveling in a path corresponding to and parallel with the sides of the said rectangular track, a carriage adapted to be engaged by said chain, and whereby a corresponding movement will be imparted to said carriage over said track from one angle on one side to the next angle, thence onto the next side without changing its relative position to the respective sides, two revolving shafts over and across said guideways, the one at right angles to one side and the other at right angles to the next side, and beneath which said carriage is adapted to pass, series of disk-like cutters on each of said shafts, and self-adjusting pressers between the cutters of each of the shafts, adapted to press upon the material carried by said carriages, substantially as described.

4. The combination of a rectangular track, a corresponding endless chain traveling in a path corresponding to and parallel with the sides of said rectangular track, a carriage adapted to be engaged by said chain, and whereby a corresponding movement will be imparted to said carriage over said track from one angle on one side to the next angle, thence onto the next side without changing its relative position to the respective sides, two revolving shafts over and across said guideways, the one at right angles to one side and the other at right angles to the next side, and beneath which said carriage is adapted to pass, series of disk-like cutters on each of said shafts, and an endless-band cutter, one run of which passes in a plane across one of said guideways and adjacent to the cutters on such guideway in a plane parallel with but above said carriage, substantially as described.

5. The combination of a rectangular track, a corresponding endless chain traveling in a path corresponding to and parallel with the sides of said rectangular track, a carriage adapted to be engaged by said chain, and whereby a corresponding movement will be imparted to said carriage over said track from one angle on one side to the next angle, thence onto the next side without changing its relative position to the respective sides, two parallel shafts over and across said guideways, the one at right angles to one side and the other at right angles to the next side, and beneath which said carriage is adapted to pass, series of disk-like cutters on each of said shafts, and an endless-band cutter, one run of which passes in a plane across one of said guideways and adjacent to the cutters on such guideway in a plane parallel with but above said carriage, with the plate $r$, arranged to support said endless cutter, substantially as described.

6. The combination of a rectangular track, a corresponding endless chain traveling in a path corresponding to and parallel with the sides of the said rectangular track, a carriage adapted to be engaged by said chain, and whereby a corresponding movement will be imparted to said carriage over said track from one angle on one side to the next angle, thence onto the next side without changing its relative position to the respective sides, two revolving shafts over and across said guideways, the one at right angles to one side and the other at right angles to the next side, and beneath which said carriage is adapted to pass, series of disk-like cutters on each of said shafts, and a stripper hung at the end on one side upon an axis at right axles to the said side, its under surface substantially flush with the upper surface of the carriage, and beneath which the said carriage must pass in traveling around the said guideway, and an arm extending from said stripper above its axis into the path of the advancing carriage as the carriage completes its movement on the one side, substantially as described, and whereby as the carriage approaches the said stripper the carriage will pass beneath the stripper and the fish onto the stripper, then as the carriage completes its movement on that side it will strike the said projection and tilt the stripper and discharge the fish.

7. The combination of a rectangular track, a corresponding endless chain traveling in a path corresponding to and parallel with the sides of the said rectangular track, a carriage adapted to be engaged by said chain, and whereby a corresponding movement will be imparted to said carriage over said track from one angle on one side to the next angle, thence onto the next side without changing its relative position to the respective sides, the surface of said carriage constructed with a series of longitudinal grooves and with a series of transverse grooves, the first series of grooves being parallel with the path of the carriage on one side, and the other series being parallel with the path of the carriage on the next side, two revolving shafts over and across said guideways, one at right angles to one side and the other at right angles to the next side, beneath which the said carriage is adapted to pass, a series of disk-like cutters on each of said shafts, and a stripper hung at the end of one side upon an axis at right angles to said side, its under surface substantially flush with the upper surface of the carriage, and beneath which the said carriage must pass in traveling around the said guideway, and an arm extending from said stripper above its axis into the path of the advancing carriage as the carriage completes its movement on that side, and the said stripper provided with fingers corresponding to and in the path of the respective grooves in the carriage as it advances toward the stripper, substantially as and for the purpose described.

JAMES J. PEARD.

Witnesses:
E. H. WILLIAMS,
CARL J. EHBERTS.